(12) United States Patent
Park et al.

(10) Patent No.: US 9,947,977 B2
(45) Date of Patent: Apr. 17, 2018

(54) ANODE FOR LITHIUM SECONDARY BATTERY, FABRICATING METHOD THEREOF AND LITHIUM AIR BATTERY HAVING THE SAME

(71) Applicant: SK INNOVATION CO., LTD., Seoul (KR)

(72) Inventors: Myounggu Park, Daejeon (KR); Kyongsik Kim, Daejeon (KR); Seongho Chun, Daejeon (KR); Heeyoung Sun, Daejeon (KR); Sangjin Kim, Daejeon (KR); Sangwon Yoon, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 15/257,167

(22) Filed: Sep. 6, 2016

(65) Prior Publication Data

US 2016/0380320 A1 Dec. 29, 2016

Related U.S. Application Data

(62) Division of application No. 14/183,891, filed on Feb. 19, 2014, now Pat. No. 9,461,302.

(30) Foreign Application Priority Data

Feb. 20, 2013 (KR) ........................ 10-2013-0017951

(51) Int. Cl.
*H01M 12/08* (2006.01)
*H01M 4/134* (2010.01)
(Continued)

(52) U.S. Cl.
CPC ......... *H01M 12/08* (2013.01); *H01M 2/0255* (2013.01); *H01M 2/08* (2013.01);
(Continued)

(58) Field of Classification Search
None
See application file for complete search history.

(56) References Cited

U.S. PATENT DOCUMENTS

2004/0253512 A1* 12/2004 Watanabe ............... H01M 2/08
429/210
2007/0178279 A1* 8/2007 Ogawa ................ H01L 23/5389
428/137

(Continued)

FOREIGN PATENT DOCUMENTS

JP 2009252636 10/2009
JP 2010192313 A * 9/2010
JP 2012227119 11/2012

OTHER PUBLICATIONS

JP 2010-192313 A English Translation.*

*Primary Examiner* — Scott J Chmielecki
(74) *Attorney, Agent, or Firm* — IP & T Group LLP

(57) ABSTRACT

Provided is an anode for a lithium secondary battery capable of improving the performance and the life of a lithium air battery by forming the anode so that lithium metal is sealed, but migration of lithium ions is possible, and thus, preventing corrosion of a lithium metal and the generation of hydrogen gas caused by permeation of moisture and oxygen gas into the anode, a manufacturing method thereof, and a lithium air battery containing the same.

8 Claims, 8 Drawing Sheets

(51) Int. Cl.
    *H01M 2/02*         (2006.01)
    *H01M 2/08*         (2006.01)
    *H01M 2/16*         (2006.01)
    *H01M 4/1395*    (2010.01)
    *H01M 4/38*         (2006.01)
    *H01M 4/66*         (2006.01)
    *H01M 4/70*         (2006.01)
    *H01M 4/04*         (2006.01)
    *H01M 4/36*         (2006.01)

(52) U.S. Cl.
    CPC ......... *H01M 2/1673* (2013.01); *H01M 4/043* (2013.01); *H01M 4/134* (2013.01); *H01M 4/1395* (2013.01); *H01M 4/366* (2013.01); *H01M 4/382* (2013.01); *H01M 4/661* (2013.01); *H01M 4/70* (2013.01); *H01M 2220/20* (2013.01); *H01M 2300/0002* (2013.01); *H01M 2300/002* (2013.01); *H01M 2300/0094* (2013.01); *Y02E 60/122* (2013.01); *Y02E 60/128* (2013.01); *Y02P 70/54* (2015.11)

(56) References Cited

U.S. PATENT DOCUMENTS

| | | | |
|---|---|---|---|
| 2008/0070087 A1* | 3/2008 | Johnson | H01M 6/187 429/405 |
| 2011/0091777 A1 | 4/2011 | Mizuno et al. | |
| 2011/0171525 A1* | 7/2011 | Abe | H01M 4/623 429/212 |
| 2012/0121965 A1* | 5/2012 | Makino | H01M 2/22 429/156 |
| 2012/0177975 A1* | 7/2012 | Yageta | H01M 2/1673 429/144 |
| 2012/0214075 A1* | 8/2012 | Johnson | H01M 2/025 429/405 |
| 2012/0270115 A1* | 10/2012 | Johnson | H01M 4/96 429/405 |
| 2013/0084507 A1* | 4/2013 | Johnson | H01M 8/1055 429/403 |
| 2013/0089774 A1* | 4/2013 | Chami | H01M 2/26 429/158 |
| 2015/0004462 A1* | 1/2015 | Huang | H01M 2/0207 429/127 |

* cited by examiner

ANODE FOR LITHIUM SECONDARY BATTERY, FABRICATING METHOD THEREOF AND LITHIUM AIR BATTERY HAVING THE SAME

CROSS-REFERENCE TO RELATED APPLICATIONS

This application is a divisional application of U.S. Ser. No. 14/183,891, filed on Feb. 19, 2014, which claims priority to and the benefit of Korean Patent Application No. 10-2013-0017951, filed on Feb. 20, 2013, in the Korean Intellectual Property Office, the entire contents of which are incorporated herein by reference.

TECHNICAL FIELD

The present invention relates to an anode for a lithium secondary battery capable of improving performance and life of a lithium air battery by preventing corrosion of a lithium metal and generation of hydrogen gas caused by permeation of moisture and oxygen gas into an anode for a lithium secondary battery, a manufacturing method thereof, and a lithium air battery including the same.

BACKGROUND

Under the backgrounds such as the increased carbon dioxide emissions due to the consumption of fossil fuels and the dramatic fluctuations of crude oil price, the technical development to shift the energy source of the vehicle from gasoline and diesel oil to electric energy, attracts attention. The electric vehicle is proceeding to practical use, and high capacity and high energy density of a lithium ion battery which is a storage battery, is required for a long distance driving. However, currently a lithium ion battery has a disadvantage of having a difficulty in a long distance driving due to a limited battery capacity. Therefore, a lithium air battery which theoretically has higher capacity than a lithium ion battery, and high energy density, attracts attention. More specifically, a lithium air battery theoretically has an energy density of 3000 Wh/kg or more, which corresponds to about 10 times of the energy density of a lithium ion battery. Besides, a lithium air battery is environmentally friendly, and may provide an improved safety as compared to a lithium ion battery.

Such lithium air battery includes an anode enabling adsorption and discharge of lithium ion; a cathode using oxygen in the air as the active material and containing oxidation and reduction catalysts for oxygen; and lithium ion conductive medium (electrolyte) provided between the anode and the cathode.

That is, the lithium air battery uses oxygen in the air as the active material and generates an oxidation-reduction reaction with the oxygen, thereby enabling charging/discharging the battery.

However, in the lithium air battery according to the related art, hydrogen is generated by lithium metal corrosion metal according to the chemical reaction between lithium and moisture ($2Li+2H_2O=2LiOH+H_2$) by permeation of moisture into lithium metal forming anode, or chemical reaction with oxygen ($4Li+O_2\rightarrow 2Li_2O$) occurs, and as a result, there is a problem that the performance of the lithium air battery is rapidly degraded.

As the related prior art, US Patent Application Publication No. 2011/0091777 entitled "LITHIUM AIR BATTERY" is disclosed.

RELATED ART DOCUMENT

US 2011/0091777 A1 (Apr. 21, 2011)

SUMMARY

An embodiment of the present invention is directed to providing an anode for a lithium secondary battery capable of improving durability of a lithium air battery, being compactly formed, and improving performance of the battery, by preventing permeation of moisture and oxygen into a lithium metal forming an anode of the lithium air battery, a manufacturing method thereof, and a lithium air battery including the same.

In one general aspect, an anode for a lithium secondary battery includes: a current collector; a lithium metal laminated on the current collector; a separator containing an electrolyte laminated on the lithium metal; a solid electrolyte laminated on the separator; and a sealing part sealing a circumferential side of a laminate in which the current collector, the lithium metal, the separator and the solid electrolyte are laminated.

The sealing part may be closely adhered to the circumferential side of the laminate in which the current collector, the lithium metal, the separator and the solid electrolyte are laminated.

The current collector may have an empty inside and open one side, and the lithium metal, the separator, and the solid electrolyte may be accommodated and laminated in turn on the inside of the current collector, and the sealing part may be formed on a contact surface between the current collector and the solid electrolyte.

The electrolyte contained in the separator may contain an organic-based electrolyte or an ionic liquid.

The current collector may be made of a nickel (Ni) or copper (Cu) material.

In another general aspect, a manufacturing method of the anode for a lithium secondary battery includes: laminating a current collector, a lithium metal, a separator containing an electrolyte and a solid electrolyte in turn to form a laminate (S10); pressing the laminate in a laminated direction (S20); forming a sealing part on a circumferential side of the laminate (S30); and removing the pressed pressure after the sealing part is formed (S40).

In the forming of the sealing part on a circumferential side of the laminate (S30), the sealing part may be formed by applying or coating any one selected from adhesive, sealant (water-repellent) and rubber.

In another general aspect, a manufacturing method of the anode for a lithium secondary battery includes: laminating a lithium metal, a separator containing an electrolyte, and a solid electrolyte in turn on the inside of a current collector having an empty inside and open one side (SA10); pressing the laminate in a laminated direction on a lower side of the current collector and on an upper side of the solid electrolyte (SA20); forming a sealing part on a contact surface between the current collector and the solid electrolyte (SA30); and removing the pressed pressure after the sealing part is formed (SA40).

In the forming of the sealing part on a contact surface between the current collector and the solid electrolyte (SA30), the sealing part may be formed by any one process selected from soldering, brazing, and laser welding.

In another general aspect, a lithium air battery includes: the anode for a lithium secondary battery as described above; a cathode including a gas diffusion layer one side of which is in contact with air, and a catalyst layer which is formed on the other side of the gas diffusion layer, and being spaced apart from the anode for a lithium secondary battery; and a water-based electrolyte to be provided between the anode and the cathode for a lithium secondary battery.

In another general aspect, a lithium air battery includes: a housing part having a first housing provided with a space part having open upper side, and a second housing arranged on an upper side of the first housing to seal the space part of the first housing, and having an air accommodating part having an open lower side and a vent hole communicating with the air accommodating part formed therein; the anode for a lithium secondary battery as described above which is accommodated in the space part of the first housing; a cathode combined with the lower side of the air accommodating part of the second housing, spaced apart from the anode for a lithium secondary battery, and having a gas diffusion layer to be arranged in an upper side, and a catalyst layer formed in a lower side of the gas diffusion layer; and a water-based electrolyte which is provided on the space part of the first housing, and between the anode and the cathode of the lithium secondary battery.

The lithium air battery may further include a receptor provided on an upper side of the anode for a lithium secondary battery, and having receiving holes penetrating through the upper and lower portions thereof, and the receptor closely adhering the anode for a lithium secondary battery to the bottom of the space part.

The housing part may further include a third housing interposed between the first housing and the second housing, and having a fixing hole penetrating through the upper and lower portions thereof, so that the cathode is fixed to the fixing hole.

Other features and aspects will be apparent from the following detailed description, the drawings, and the claims.

DETAILED DESCRIPTION OF MAIN ELEMENTS

Figure 1A:
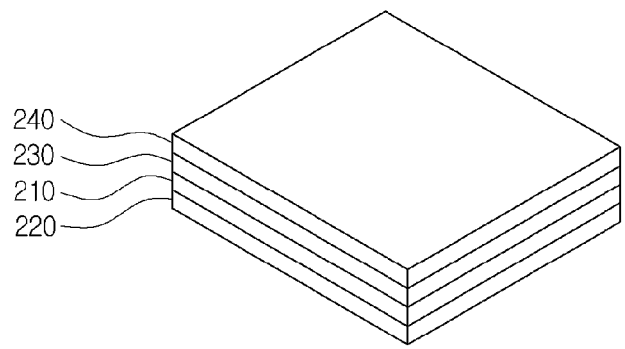
FIGS. 1A to 1C are perspective views representing the anode for a lithium secondary battery according to a first exemplary embodiment (a method using sealant), and a manufacturing method thereof.

1000: lithium air battery
100: housing part
110: first housing
111: space part
112: combining hole
120: second housing
121: vent hole
122: air accommodating part
127: first fixing part
128: first combining part
130: third housing
131: fixing hole
132: second fixing part
133: second combining part
134: penetrating hole
200, 300: anode for a lithium secondary battery
210, 310: lithium metal
220, 320: current collector
230, 330: separator (organic electrolyte)
240, 340: solid electrolyte
250, 350: sealing part
400: cathode
411: gas diffusion layer
412: catalyst layer
530: receptor
531: receiving hole
540: first sealing part
550: water-based electrolyte

DETAILED DESCRIPTION OF EMBODIMENTS

Hereinafter, an anode for a lithium secondary battery, a manufacturing method thereof, and a lithium air battery including the same of the present invention will be described in detail with reference to the accompanying drawings FIGS. 1A to 1C and 2 are a perspective view representing the anode for a lithium secondary battery according to a first exemplary embodiment and a manufacturing method thereof, and a cross-sectional view representing a cross-section of the anode for a lithium secondary battery, respectively.

As shown therein, the anode for a lithium secondary battery 200 according to a first exemplary embodiment includes a current collector 220; a lithium metal 210 laminated on the current collector 220; a separator 230 containing an electrolyte laminated on the lithium metal 210; a solid electrolyte 240 laminated on the separator 230; and a sealing part 250 sealing a circumferential side of a laminate in which the current collector 220, the lithium metal 210, the separator 230 and the solid electrolyte 240 are laminated.

First, the anode for a lithium secondary battery 200 of the present invention is formed by laminating the current collector 220, the lithium metal 210, the separator 230, and the solid electrolyte 240 in turn, on the upper side of each, and forming the sealing part 250 to seal the circumferential side of this laminate.

In this case, the current collector 220 which is a part to collect and conduct current, may be made of metal, especially nickel (Ni) or copper (Cu) material through which current highly flows. Moreover, the lithium metal 210 enables the storage and the emission of lithium ions, and charging/discharging occurs therein. The separator 230 contains an electrolyte containing an organic-based electrolyte or ionic liquid to enable the migration of lithium ions, and serves to prevent direct contact of lithium metal 210 with cathode. The solid electrolyte 240 enables the migration of lithium ions, but blocks the migration of other materials.

In addition, the sealing part 250 is formed so as to seal the circumferential side of the laminate, and keeps the laminated current collector 220, lithium metal 210, separator 230 and solid electrolyte 240 in a laminated state, and serves to seal the circumferential side of the laminate.

In this case, the sealing part 250 may be closely adhering to the circumferential side of the laminate in which the current collector 220, the lithium metal 210, the separator 230 and the solid electrolyte 240 are laminated.

That is, since the lithium metal 210 is combined so as to be sealed by the current collector 220, the solid electrolyte 240, and the sealing part 250 closely adhered to the circumferential side of the laminate, the migration of lithium ions is possible through the separator 230 and the solid electrolyte 240, while the permeation of moisture and oxygen gas into the lithium metal 210 may be prevented.

As described above, the anode for a lithium secondary battery of the present invention may prevent the permeation of moisture into the lithium metal forming the anode, and thus, the durability of the battery may be improved, and the rapid degradation of the performance may be prevented. In addition, since the anode is compactly formed, and has the improved electrochemical properties, the performance of the battery may be improved.

Moreover, an organic-based electrolyte easily forms interface film, that is, SEI solid electrolyte interphase (SEI) layer which is stable, and favorable to cycling characteristic, and thus, is favorable to a lithium-air battery using lithium metal. For example, a lithium salt used in the organic-based electrolyte may be one or two or more selected from the group consisting of $LiPF_6$, Lithium bis(fluorosulfonly)imide) (LiTFSI), $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are a natural number, respectively), LiF, LiBr, LiCl, LiI and $LiB(C_2O_4)_2$ (lithium bis(oxalato) borate; LiBOB). As a solvent, propylene carbonate (PC), ethylene carbonate (EC), dimethyl carbonate (DMC), diethyl carbonate (DEC), and the like may be used alone or in mixed state of two or more selected therefrom. In this case, a concentration of the lithium salt may be used within a range of 0.1 to 2.0 M(mol/L). If the concentration of the lithium salt is within the above range, the electrolyte has appropriate conductivity and viscosity, thereby exhibiting excellent electrolyte performance, effectively migrating lithium ions, and forming SEI layer which is favorable to life characteristic.

The ionic liquid has the advantages of non-flammability, low vapor pressure, high thermal stability, and high ion conductivity due to high ion content. The ionic liquid according to an exemplary embodiment of the present invention may be selected from the compounds represented by following Chemical Formula 1, and the mixtures thereof:

$X^+Y^-$ [Chemical Formula 1]

wherein $X^+$ is imidazolium ion, pyrazolium ion, pyridinium ion, pyrolidium ion, ammonium ion, phosphonium ion or sulfonium ion; and $Y^-$ is $(CF_3SO_2)_2N^-$, $(FSO_2)_2N^-$, $BF_4^-$, $PF_6^-$, $AlCl_4^-$, halogen$^-$, $CH_3CO_2^-$, $CF_3CO_2^-$, $CH_3SO_4^-$, $CF_3SO_3^-$, $(CF_3SO_2)N^-$, $NO_3^-$, $SbF_6^-$, $MePhSO_3^-$, $(CF_3SO_2)_3C^-$ or $(R'')_2PO_2^-$ (wherein R'' is C1-C5 alkyl).

In the above Chemical Formula 1, cation ($X^+$) may be exemplified as following Table 1.

TABLE 1

| Cation structure ($X^+$) | Structure name |
|---|---|
| imidazolium ion | (ring structure with $R^1$, $R^2$, $R^3$) |
| pyridinium ion | (ring structure with R, $R^6$) |
| phosphonium ion | (structure with $R^{11}$, $R^{12}$, $R^{13}$, $R^{14}$) |
| pyrazolium ion | (ring structure with $R^{18}$, $R^{19}$, $R^{20}$) |
| pyrrolidium ion | (ring structure with $R^4$, $R^5$) |
| ammonium ion | (structure with $R^7$, $R^8$, $R^9$, $R^{10}$) |
| sulfonium ion | (structure with $R^{15}$, $R^{16}$, $R^{17}$) |

In above Table 1, $R^1$ to $R^{20}$ and R are (C1-C20)alkyl, (C2-C20)alkenyl or (C2-C20)alkynyl, respectively, and the alkyl, alkenyl and alkynyl may be further substituted by at least one selected from hydroxyl, amino, $—SO_3H$, $—COOH$, (C1-C5)alkyl, (C1-C5)alkoxy, and $Si(R^{21})—(R^{22})(R^{23})$ (wherein $R^{21}$, $R^{22}$ and $R^{23}$ are independently of one another hydrogen or (C1-C5)alkyl, (C1-C5)alkoxy), respectively.

In the above Chemical Formula 1, anion ($Y^-$) species may be exemplified as following Table 2.

TABLE 2

| Anion | Anion name | Anion | Anion name |
|---|---|---|---|
| $BF_4^-$ | tetrafluoroborate | $(CF_3SO_2)N^-$ | bis[(trifluoromethyl)sulfonyl]amide |
| $PF_6^-$ | hexafluorophosphate | $NO_3^-$ | nitrate |
| $AlCl_4^-$ | aluminium chloride | $SbF_6^-$ | hexafluoroanimonate |
| $X^-$ | Halogen | $(FSO_2)_2N^-$ | Bis[fluorosulfonyl]imide |
| $CH_3CO_2^-$ | acetate | $MePhSO_3^-$ | tosylate |
| $CF_3CO_2^-$ | trifluoroacetate | $(CF_3SO_2)_2N^-$ | bis(trifluoromethylsulfonyl)imide |

TABLE 2-continued

| Anion | Anion name | Anion | Anion name |
|---|---|---|---|
| $CH_3SO_4^-$ | methylsulfate | $(CF_3SO_2)_3C^-$ | tris(trifluoromethyl-sulfonyl)methide |
| $CF_3SO_3^-$ | trifluoromethyl-sulfate | $(OR)_2PO_2^-$ | dialkyl phosphate |

The examples of ionic compound according to an exemplary embodiment include 1-methyl-3-ethyl imidazolium bis(trifluoromethanesulfonyl)imide, 1-methyl-3-propyl imidazolium bis(trifluoromethanesulfonyl)imide, 1-methyl-3-allyl imidazolium bis(trifluoromethanesulfonyl)imide, 1-methyl-3-ethyl imidazolium bis(fluorosulfonyl)imide, 1-methyl-3-propyl imidazolium bis(fluorosulfonyl)imide, 1-methyl-3-allyl imidazolium bis(fluorosulfonyl)imide, 1-methyl-1-propyl pyrrolidium bis(trifluoromethanesulfonyl)imide, 1-methyl-1-allyl pyrrolidium bis(trifluoromethanesulfonyl)imide, 1-methyl-1-propyl pyrrolidium (fluorosulfonyl)imide, 1-methyl-1-allyl pyrrolidium (fluorosulfonyl)imide, 1-butyl-3-methylimidazoliumchloride, 1-butyl-3-methylimidazolium dibutylphosphate, 1-butyl-3-methylimidazolium dicyanamide, 1-butyl-3-methylimidazolium hexafluorohexafluoroantimonate, 1-butyl-3-methylimidazolium hexafluorophosphate, 1-butyl-3-methylimidazolium hydrogencarbonate, 1-butyl-3-methylimidazolium hydrogensulphate, 1-butyl-3-methylimidazolium methylsulphate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridium chloride, 1-butyl-4-methylpyridium tetrafluoroborate, 1-butyl-4-methylpyridium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluorobopyrollidiniumrate, triiso butylmethylphosphonium tosylate 1-butyl-1-methylpyrolidinium, 1-butyl-1-methylpyrolidium bromide, 1-butyl-1-methylpyrolidium tetrafluoroborate, 1-aryl-3-methylimidazolium bromide, 1-aryl-3-methylimidazolium chloride, 1-benyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoro methylsulfonyl)amide, 1,3-dimethylimidazolium dimethyl phosphate, 1-ethyl-2,3-dimethylimidazolium ethyl sulphate, and the like, preferably 1-ethyl-3-methylimidazolium aluminium chloride, 1-butyl-4-methylpyridium hexafluorophosphate, benzyldimethyltetradecylaluminium chloride, tributylmethylaluminium chloride, tetrabutylphosphinium tetrafluoroborate, 1-butyl-1-methylpyrolidium chloride, 1-butyl-3-methylimidazolium tetrachloroaluminate, 1-butyl-4-methylpyridium chloride, 1-butyl-4-methylpyridium tetrafluoroborate, and the like.

The ionic liquid according to an exemplary embodiment may include cations represented by the following Chemical Formula 2 or 3, in order to have preferably high ion conductivity and viscosity representing superior electrical characteristic:

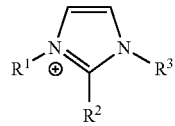

[Chemical Formula 2]

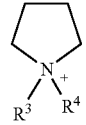

[Chemical Formula 3]

wherein $R^1$ to $R^4$ are (C1-C20)alkyl, (C2-C20)alkenyl or (C2-C20)alkynyl, respectively; and the alkyl, alkenyl and alkynyl may be further substituted by at least one selected from hydroxy, amino, $-SO_3H$, $-COOH$, (C1-C5)alkyl, (C1-C5)alkoxy, and $Si(R^{21})(R^{22})(R^{22})$ (wherein $R^{21}$, $R^{22}$ and $R^{23}$ are independently of one another hydrogen or (C1-C5)alkyl, (C1-C5)alkoxy), respectively.

More preferably, the ionic liquid may include at least one compounds selected from the following structures.

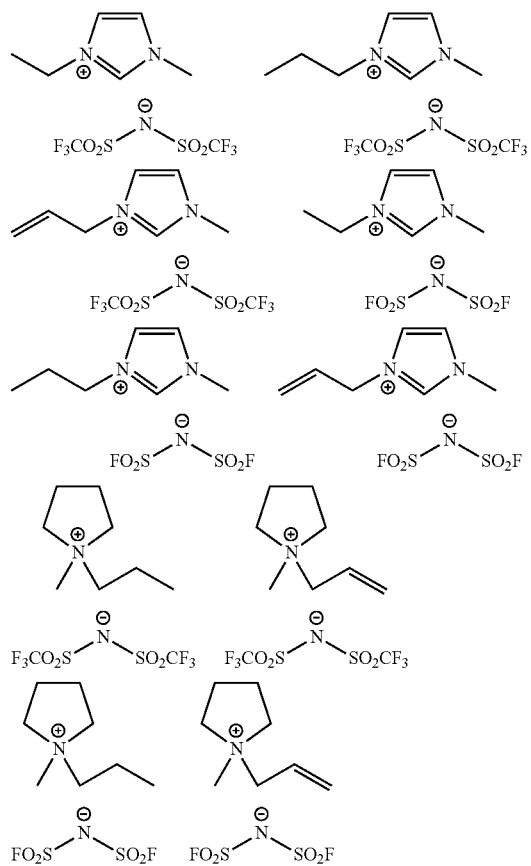

The ionic liquid according to an exemplary embodiment may be prepared as indicated in following Reaction Formula 1, but the preparation process of the ionic liquid of Chemical Formula 1 is not limited thereto, and it will be apparent to a person skilled in the art that the preparation process may be modified:

[Reaction Formula 1]

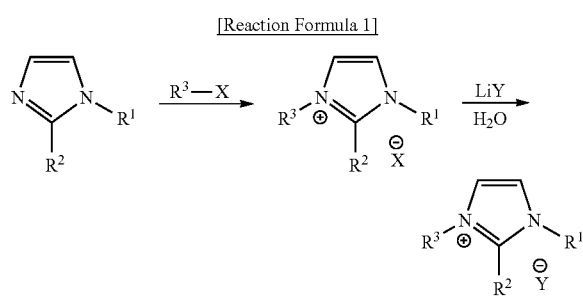

wherein $R^1$ to $R^3$ and Y are the same as defined in the above Chemical Formula 1, respectively; and X is halogen.

The ionic liquid according to an exemplary embodiment may include at least one lithium salt selected from the group consisting of $LiPF_6$, LiTFSI, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are a natural number, respectively), LiCl, LiI and $LiB(C_2O_4)_2$, and the lithium salt may be contained in concentration of 0.025 to 1M so as to increase ion conductivity while produced $Li_2O_2$ does not inhibit the continuous reaction on the surface of porous cathode.

The manufacturing method of an anode for a lithium secondary battery according to a first exemplary embodiment includes forming a laminate by laminating a current collector 220, a lithium metal 210, a separator containing an electrolyte 230 and a solid electrolyte 240 in turn (S10); pressing the laminate in the laminated direction (S20); forming a sealing part 250 on the circumferential side of the laminate (S30); and removing the pressed pressure after the sealing part 250 is formed (S40).

Figure 1B:
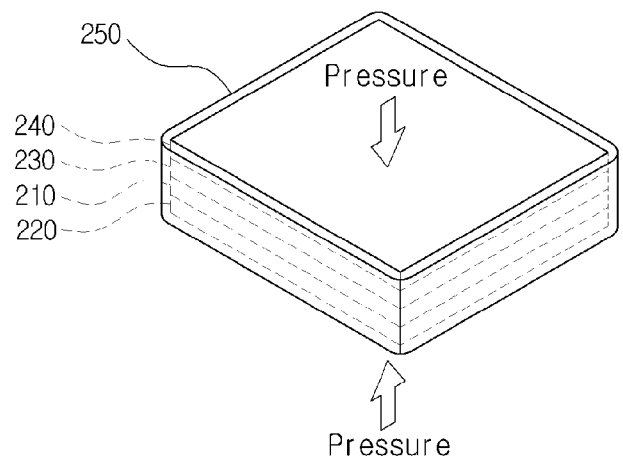
Figure 1C:
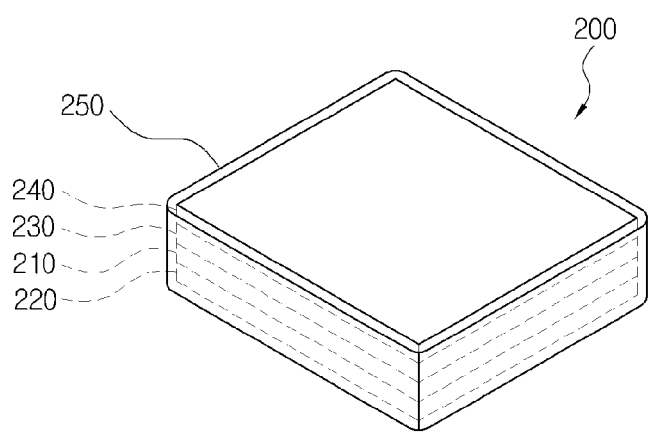

That is, as shown in FIG. 1A, a current collector 220, a lithium metal 210, a separator containing an electrolyte 230 and a solid electrolyte 240 are laminated in turn, to form a laminate; as shown in FIG. 1B, a sealing part 250 is formed on the circumferential side of the laminate, in the state in which the laminate is pressed in the laminated direction, i.e., vertical direction so as to closely adhered to the contact surfaces; and then as shown in FIG. 1C, the pressed pressure on the laminate is removed, so that the laminate may be combined to be kept in closely adhered state.

Figure 2:
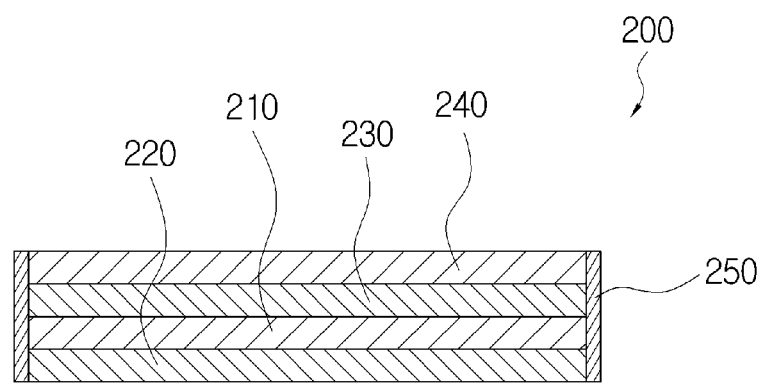
FIG. 2 is a cross-sectional view representing a cross-section of the anode for a lithium secondary battery according to a first exemplary embodiment (a method using sealant)

Moreover, as shown in FIG. 2, since the circumferential side of the laminate is sealed by the sealing part 250, moisture is not permeated into the contact surface of the laminate, and since the lithium metal 210 is sealed by the current collector 220 and the solid electrolyte 240 formed on the bottom and the top of the laminate, respectively, the structure wherein moisture is not permeated into both the top and the bottom of the laminate may be constituted.

Moreover, since the contact surfaces of the laminate are closely adhered, the contact resistance is decreased, and the performance and the efficiency are improved.

In this case, in S30, the sealing part 250 may be formed by applying or coating any one selected from adhesive, sealant (water-repellent), and rubber.

FIGS. 3A to 3C and 4 are a perspective view representing the anode for a lithium secondary battery according to a second exemplary embodiment and the manufacturing method thereof, and a cross-sectional view representing a cross-section of the anode for a lithium secondary battery, respectively.

As shown therein, the anode 300 for a lithium secondary battery according to a second exemplary embodiment is formed by forming the current collector 320 wherein the inside is empty and the one side is open; accommodating and laminating the lithium metal 310, the separator 330 and the solid electrolyte 340 in turn on the inside of the current collector 320; and forming the sealing part 350 on the contact surface of the current collector 320 and the solid electrolyte 340.

This is partially similar to the first exemplary embodiment, but the current collector 320 is in the form of a container wherein the inside is empty and the upper side is open; in the inside of the empty current collector 320, the lithium metal 310, the separator containing an electrolyte 330, and the solid electrolyte 340 are laminated upward in turn; and then the sealing part 350 is formed on the contact surface of the current collector 320 and the solid electrolyte 340.

Thus, since the lithium metal 310 is sealed by the current collector 320, the solid electrolyte 340, and the sealing part 350, the migration of lithium ions through the separator 330 and the solid electrolyte 340 is possible, while the permeation of moisture and oxygen gas into the lithium metal 310 may be prevented.

Furthermore, the manufacturing method of the anode for a lithium secondary battery according to the second exemplary embodiment includes laminating the lithium metal 310, the separator containing an electrolyte 330, and the solid electrolyte 340 in turn on the inside of the current collector 320 having empty inside and open one side (SA10); pressing the laminate in the laminated direction on the lower side of the current collector 320 and the upper side of the solid electrolyte 340 (SA20); forming the sealing part 350 on the contact surface of the current collector 320 and the solid electrolyte 340 (SA30); and removing the pressed pressure after the sealing part 350 is formed (SA40).

Figure 3A:
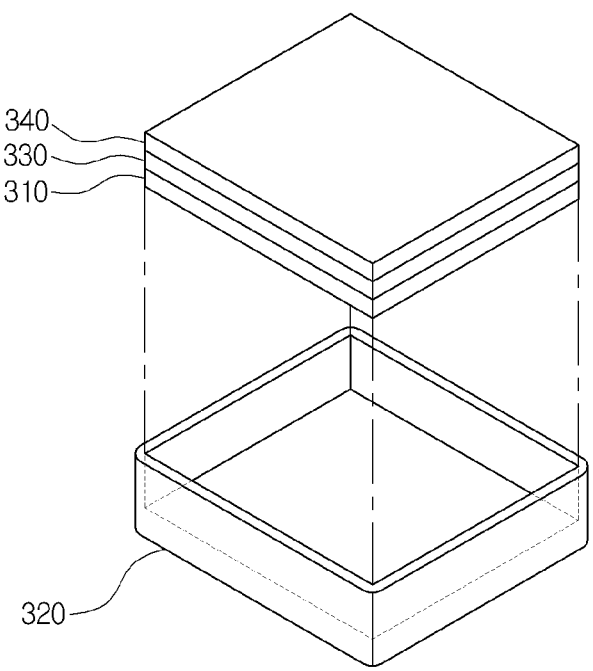
FIGS. 3A to 3C are perspective views representing an anode for a lithium secondary battery according to a second exemplary embodiment (a method using laser welding), and the manufacturing method thereof.
Figure 3B:
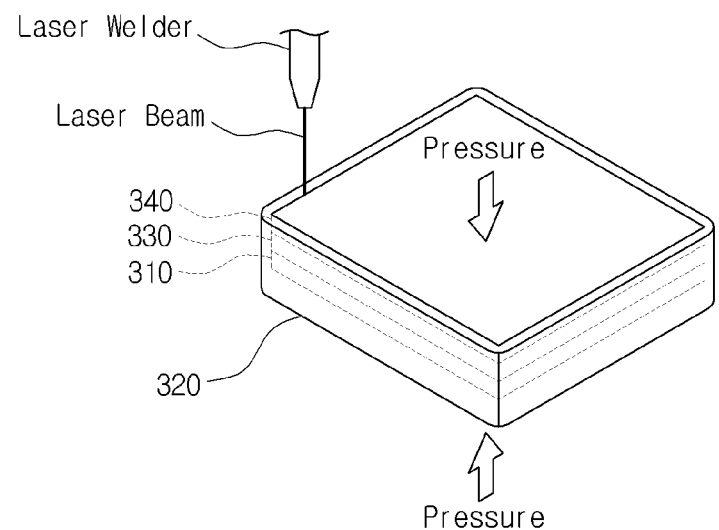
Figure 3C:
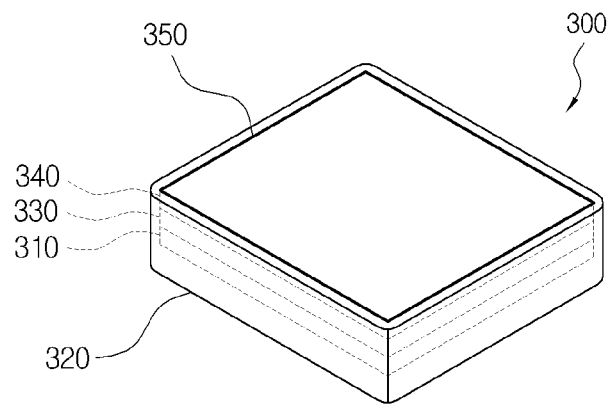

That is, as shown in FIG. 3A, the lithium metal 310, the separator containing an electrolyte 330 and the solid electrolyte 340 are laminated in turn; as shown in FIG. 3B, the contact surface of the current collector 320 and the solid electrolyte 340 is welded in the state wherein the contact surface is closely adhered by pressing the laminate in the laminated direction, i.e., vertical direction, so that the welded part becomes the sealing part; and then, as shown in FIG. 3C, the pressed pressure on the laminate is removed, so that the laminate may be combined to be kept in closely adhered state. Thus, a structure wherein lithium metal 310 is sealed not so as to be permeated by moisture can be formed, and since the contact surfaces of the components to be laminated are closely adhered, the contact resistance is decreased, and the performance and the efficiency can be improved.

Figure 4:
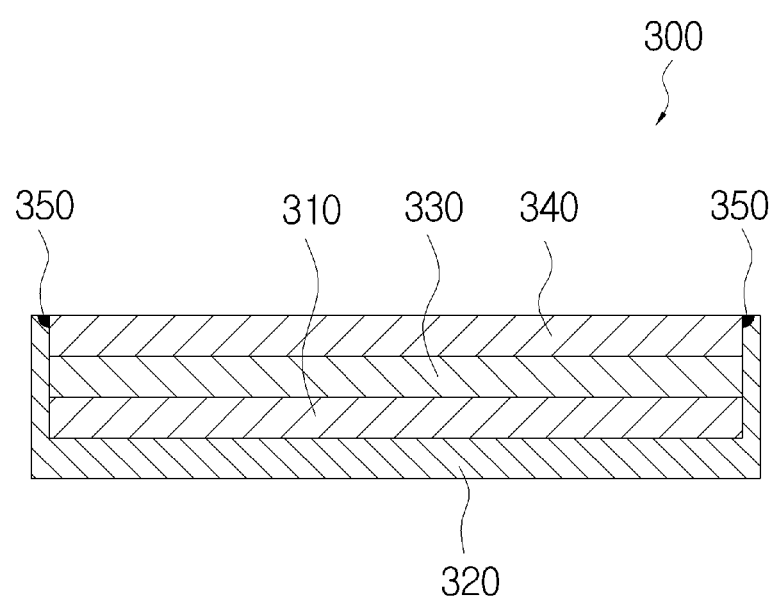
FIG. 4 is a cross-sectional view representing a cross-section of the anode for a lithium secondary battery according to a second exemplary embodiment (a method using laser welding)

In this case, in above SA30, the sealing part 350 is formed by any one process selected from soldering, brazing, and laser welding. Here, since the current collector 320 is a metal such as copper, and the solid electrolyte 340 is ceramic material, the current collector 320 is partly melted by using laser welding, and closely adhered to the solid electrolyte 340, so that the welded part is formed as the sealing part 350, as shown in FIG. 4.

Moreover, the lithium air battery 1000 of the present invention includes the anode for a lithium secondary battery 200, 300; a cathode 400 including a gas diffusion layer 411 one side of which is in contact with air, and a catalyst layer 412 which is formed on the other side of the gas diffusion layer 411, and being spaced apart from the anode for a lithium secondary battery 200, 300; and a water-based electrolyte 550 to be provided between the anode for a lithium secondary battery 200, 300 and the cathode 400.

First, the lithium air battery 1000 of the present invention is largely composed of the anode for a lithium secondary battery 200, 300, the cathode 400, and the water-based electrolyte 550.

As the anode for a lithium secondary battery 200, 300, the anode for a lithium secondary battery 200 according to the first exemplary embodiment, or the anode for a lithium secondary battery 300 according to the second exemplary embodiment may be used, hereinafter the anode for a lithium secondary battery 200 according to the first exemplary embodiment will be described.

The anode for a lithium secondary battery 200 is formed by laminating the current collector 220, the lithium metal 210, the separator containing an electrolyte 230, and the solid electrolyte 240 in turn to form a laminate, and forming the closure part 250 on the circumferential side of this laminate, as described above. In this case, the lithium metal 210 enables the storage and the emission of lithium ions, and may further contain a binder. As the lithium metal 210, for example, lithium metal, lithium metal-based alloy or lithium intercalating compound, and the like may be used, and it is preferred that lithium alloy is used for improving durability against moisture, and the like. As a binder, for example, polyfluorovinylidene (PVdF), polytetrafluoroethylene (PTFE), and the like are mentioned, and the content of the binder is not particularly limited, but may be for example, 30 wt % or less, more specifically 1 to 10 wt %.

Cathode 400 is composed of a gas diffusion layer (GDL) 411 having one side which is in contact with air and a catalyst layer 412, and spaced apart from the anode for a lithium secondary battery 200. In this case, it is configured that on the side across which the cathode 400 and the anode for a lithium secondary battery 200 face each other, the catalyst layer 412 and the solid electrolyte 240 are arranged, respectively. Thus, it is configured that air is diffused through the gas diffusion layer 411, and causes an oxidation/reduction reaction between lithium ions and oxygen in the air on the catalyst layer 412. Moreover, the cathode 400 uses oxygen in the air as an active material, and may contain conductive materials having pores through which oxygen and lithium ions migrate. The catalyst layer 412 may be formed by mixing platinum (Pt) and a binder and applying or coating the mixture. That is, the catalyst layer 412 may be formed by mixing a catalyst, a conductive material and a binder, then press-molding the mixture on the gas diffusion layer 411 (or carbon paper); or mixing a catalyst, a conductive material, and a binder in an organic solvent such as acetone, methyl ethyl ketone, and N-methyl-2-pyrrolidone, dissolving or dispersing the mixture to adjust a slurry, coating the slurry on a gas diffusion layer 411 according to a process such as gravure coating, blade coating, comma coating, and dip coating, then volatilizing the organic solvent, and pressing the layer.

Moreover, as the conductive material, for example, carbon material, conductive fiber such as metal fiber, metal powder such as copper, silver, nickel and aluminum, organic conductive material such as polyphenylene derivative may be used. As carbon material, carbon black, graphite, activated carbon, carbon nanotube, carbon fiber, and the like may be used, and mesoporous carbon obtained by firing synthetic resin including aromatic cyclic compound, petroleum pitch, and the like may be also used.

It is configured that the water-based electrolyte 550 is provided between the anode for a lithium secondary battery 200 and the cathode 400 so that lithium ions migrate.

Thus, since the moisture of the water-based electrolyte 550 is not permeated into the lithium metal 210 of the anode for a lithium secondary battery 200, the lithium air battery 1000 has the advantages of preventing the rapid degradation of the performance, and improving the durability of the battery.

Figure 5:
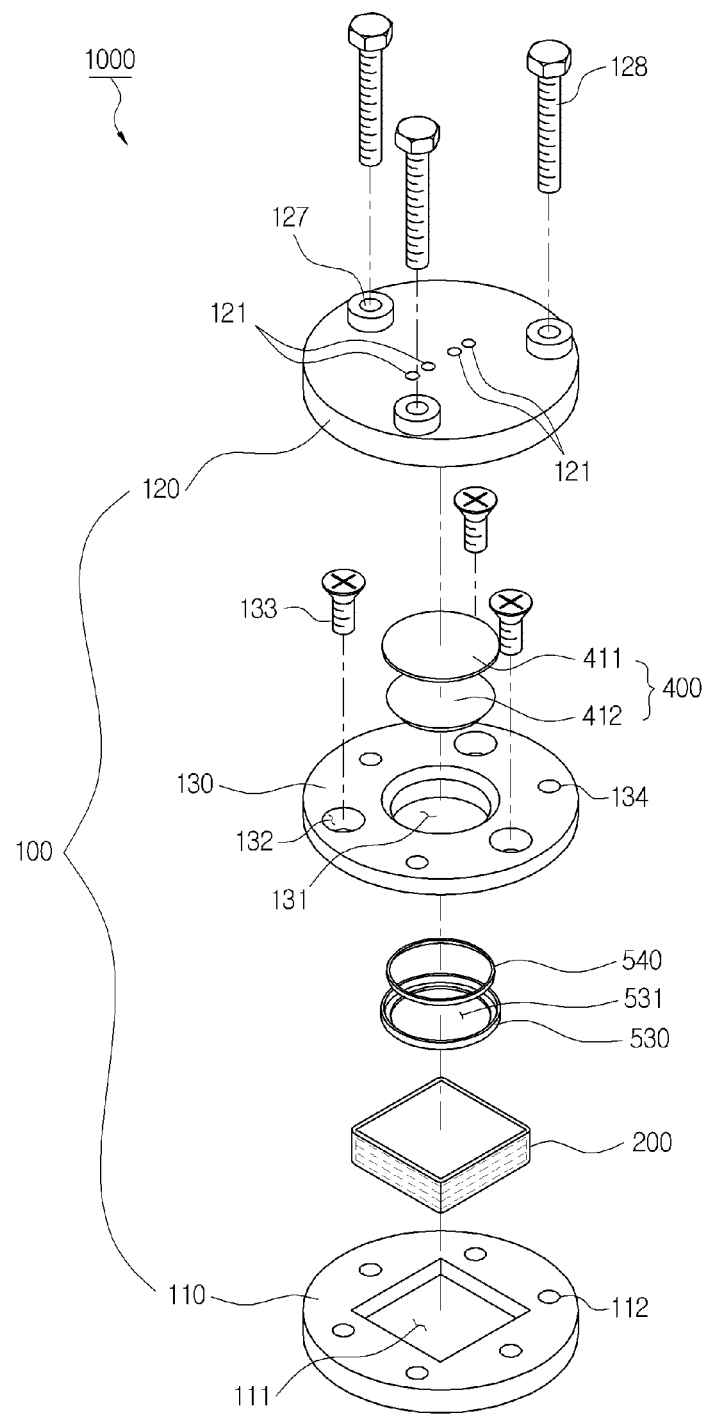
FIGS. 5 and 6 are an exploded perspective view and an assembling perspective view representing the lithium air battery according to an exemplary embodiment, respectively.
Figure 6:
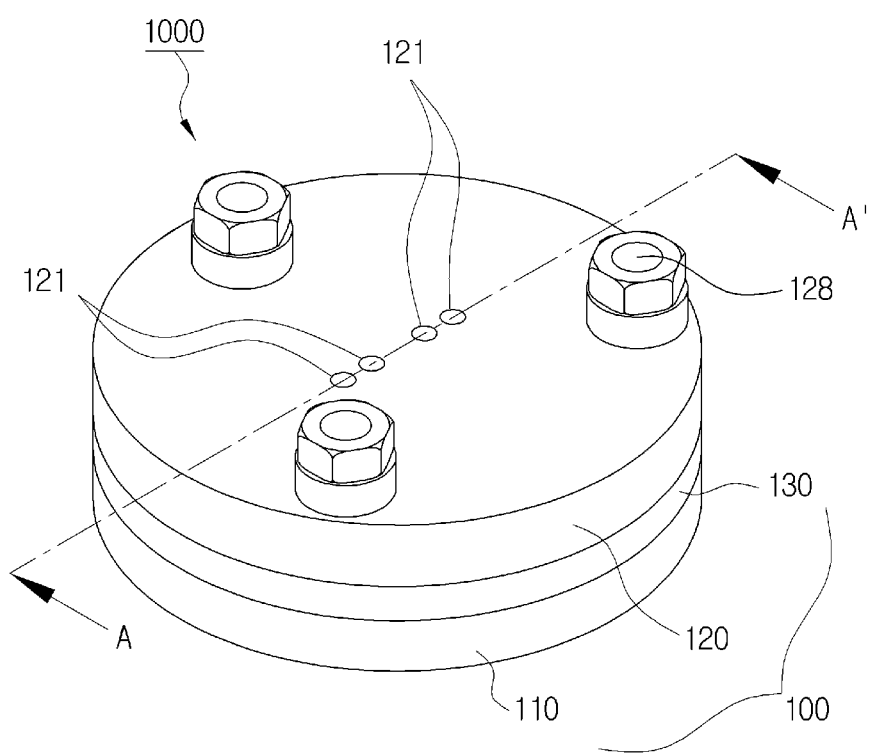
Figure 7:
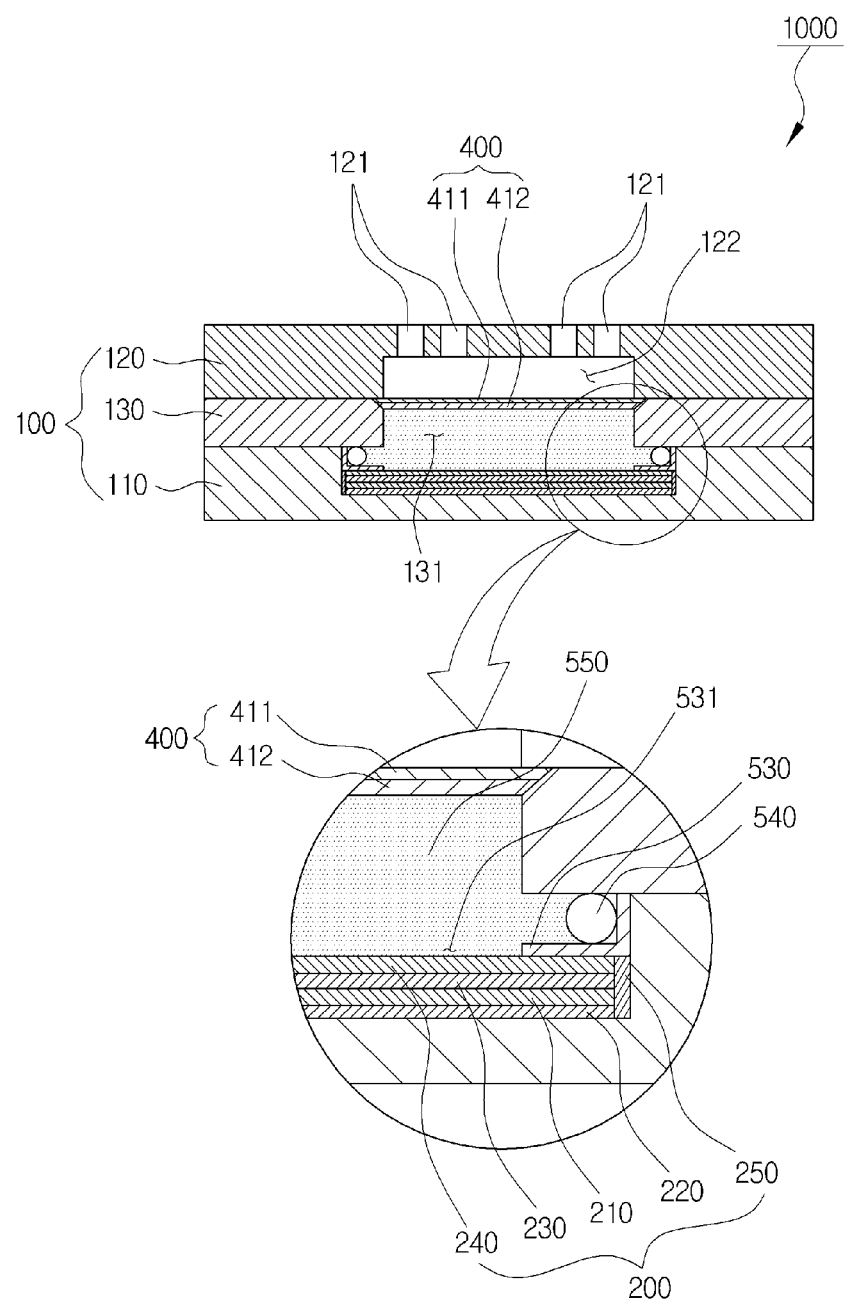
FIG. 7 is a cross-sectional view taken along a line A-A' of FIG. 6, including the anode for a lithium secondary battery according to a first exemplary embodiment.

FIGS. 5 to 7 are an exploded perspective view, an assembling perspective view, and a cross-sectional view taken along a line A-A' representing the lithium air battery according to an exemplary embodiment, respectively.

As shown therein, the lithium air battery 1000 according to an exemplary embodiment includes a housing part 100 having a first housing 110 provided with a space part 111 having open upper side, and a second housing 120 arranged on the upper side of the first housing 110 to seal a space part 111 of the first housing 110, and having an air accommodating part 122 having an open lower side, and a vent hole 121 to communicate with the air accommodating part 122 formed therein; the anode for a lithium secondary battery 200 which is accommodated in the space part 111 of the first housing 110; a cathode 400 combined with the lower side of the air accommodating part 122 of the second housing 200, spaced apart from the anode for a lithium secondary battery 200, and has the gas diffusion layer 411 arranged in the upper side, and a catalyst layer 412 formed in a lower side of the gas diffusion layer 411; and a water-based electrolyte 550 provided on the space part 111 of the first housing 110, and between the anode for the lithium secondary battery 200 and the cathode 400.

First, the lithium air battery 1000 according to an exemplary embodiment largely has the anode for a lithium secondary battery 200, the cathode 400 and the water-based electrolyte 550 in the housing part 100.

The housing part 100 includes the first housing 110 and the second housing 120. The first housing 110 has a disc shape, and a space part 111 is provided in the inside, and formed as having open upper side. Moreover, the second housing 120 is formed in the shape of a disc, arranged on the upper side of the first housing 110, and combined so that the space part 111 of the first housing 110 is sealed. In this case, the second housing 120 has the air accommodating part 122 formed on its lower side, and a vent hole 121 formed to be communicated with the air accommodating part 122, and external air may be introduced and emitted to the air accommodating part 122 via a vent hole 121. One or plural vent holes 121 may be formed, and may be formed in various forms so as to introduce and emit air to the air accommodating part 122.

Moreover, the second housing 120 is formed to have the first fixing part 127 for combining with the first housing 110 on the one side, and may be combined with the first housing 110 by inserting the first combining part 128 into the first fixing part 127. In this case, the first fixing part 127 of the second housing 120 is formed as a penetrating hole, the first combining part 128 is formed as a bolt, and a combining hole 112 is formed by a female screw on the position corresponding to the first fixing part 127 on the first housing 110, so that the first combining part 128 passes through the first fixing part 127 to be combined with the combining hole 112, and the first housing 110 and the second housing 120 are combined. Moreover, the first housing 110 and the second housing 120 may be combined in various forms by fitting, welding, or riveting, and the like, as well as the screw coupling.

The anode for a lithium secondary battery 200 is accommodated in the space part 111 so that the current collector 220 is closely adhered to the bottom of the space part 111 and the solid electrolyte 240 is positioned on the upper side.

The cathode 400 is combined so as to seal the open lower side of the air accommodating part 122 of the second housing 120, wherein the air diffusion layer 411 is positioned on the upper side, and the catalyst layer 412 is formed on the lower side. Thus, it is configured that the air accommodated in the air accommodating part 122 is diffused through the gas diffusion layer 411, and causes a oxidation/reduction reaction between lithium ions and oxygen in the air on the catalyst layer 412.

The water-based catalyst 550 is filled in the space part 111 of the first housing 110. That is, it is provided between the anode for a lithium secondary battery 200 and the cathode 400 so that lithium ions migrate.

Thus, the lithium air battery according to an exemplary embodiment has the advantages of having simple constitution, due to the compactly constituted anode, and capable of improving the performance of the battery, due to the improved electrochemical properties of the anode.

In addition, the lithium air battery (1000) further includes a receptor 530 which is provided on the upper side of the anode for a lithium secondary battery 200 and formed as having a receiving hole 531 penetrating through the upper and lower portions formed therein, and the receptor 530 may closely adhere the anode for a lithium secondary battery 200 to the bottom of the space part 111.

That is, the upper border of the receptor 530 is pressed down by the second housing 120, and the anode for a lithium secondary battery 200 may be closely fixed on the bottom of the space part 111 by the receptor 530, as shown in FIG. 7. In this case, it is configured that the receptor 530 has a receiving hole 531 penetrating through the upper and lower portions in the center, and thus, the water-based electrolyte 550 is in contact with the solid electrolyte 240 through the receiving hole 531 so that lithium ions migrate.

Thus, the lithium air battery 1000 according to an exemplary embodiment has the reduced contact resistance between the anode for a lithium secondary battery 200 and the first housing 110, and thus, the efficiency and the performance of the battery may be improved.

Moreover, by interposing the first sealing part 540 in the upper border of the receptor 530, and then combining the first housing 110 and the second housing 120, the anode for a lithium secondary battery 200 may be closely adhered to the bottom of the space part 111 by the receptor 530. In this case, the first sealing part 540 is formed as O-ring to closely adhere the anode for a lithium secondary battery 200 on the bottom of the space part 111, and prevent the water-based electrolyte 550 from leaking to the outside of the housing part 100.

In addition, the housing part 100 includes a fixing hole 131 interposed between the first housing 110 and the second housing 120, and penetrating the upper and lower portions, and further, the third housing 130, so that the cathode 400 is fixed to the fixing hole 131.

That is, the third housing 130 is interposed and closely adhered between the first housing 110 and the second housing 120, as shown in FIGS. 5 to 7. In this case, after the anode for a lithium secondary battery 200, the receptor 530, and the first sealing part 540 are accommodated in the space part 111 of the first housing 110, the third housing 130 is combined from the upper so that the anode for a lithium secondary battery 200 is closely adhered to the bottom of the space part 111 of the first housing 110. The first housing 110 and the third housing 130 may be screwed by the second combining part 133 formed as a bolt and the combining hole 112 formed as a female screw thread on the first housing 110. Here, the third housing 130 has the second fixing part 132 formed as a penetrating hole to be penetrated by the second combining part 133, the second fixing part 132 is formed as having inclined upper side, and the second combining part 133 is formed as a countersunk bolt. Thus, the upper head part of the second combining part 133 is formed not to be protruded more than the upper side of the third housing 130 so that the second housing 120 may be easily closely combined to the upper side of the third housing 130.

Thereafter, the second housing 120 is closely combined to the upper side of the third housing 130, and the penetrating hole 134 is formed on the third housing 130, so that the first combining part 128 penetrates the first fixing part 127 and the penetrating hole 134, and is screwed in the combining hole 112 of the first housing 110.

In this case, the fixing hole 131 is formed on the third housing 130, and the border of the cathode 400 is closely fixed between the upper border of the fixing hole 131 and the second housing 120. In this case, as illustrated in the drawings, the upper border of the fixing hole 131 may be formed to be inclined, or to have a step so as to be fixed by mounting the border of the cathode 400 on the step. In addition, it is configured that the water-based electrolyte 550 is accommodated on the fixing hole 131, so as to enable the migration of lithium ions between the anode for a lithium secondary battery 200 and the cathode 400.

Thus, there are some advantages that the first housing 110, the second housing 120, and the third housing 130 may be tightly combined and closely adhered, the adhesion strength of the anode for a lithium secondary battery 200 may be improved, and the combination and the fixing of the cathode 400 are easier.

Figure 8:
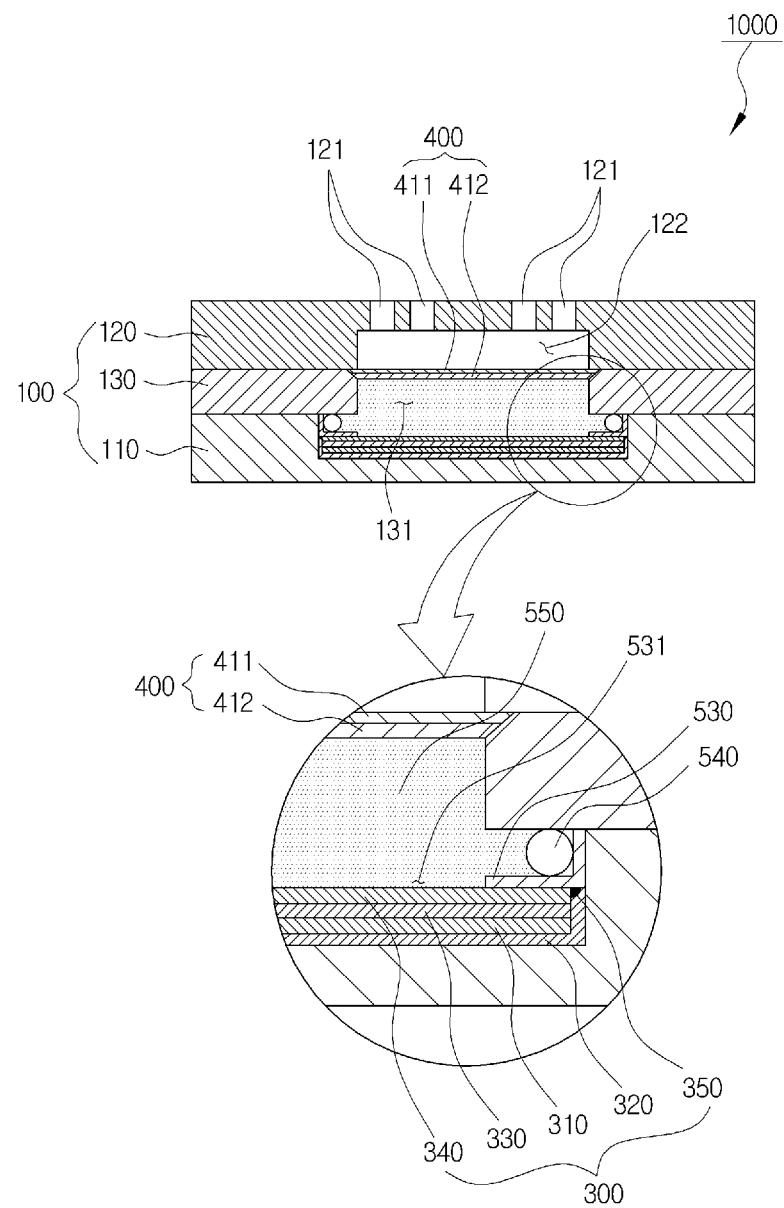
FIG. 8 is a cross-sectional view including the anode for a lithium secondary battery according to a second exemplary embodiment.

In addition, as in FIG. 8, using the anode for a lithium secondary battery 300 according to a second exemplary embodiment, a lithium air battery may be formed in the same configuration as described above.

As such, anode for a lithium secondary battery of the present invention, the manufacturing method thereof, and the lithium air battery including the same may prevent the permeation of moisture and oxygen gas into the lithium metal forming the anode of the lithium air battery, and thus, the durability may be improved, and rapid degradation of performance of the lithium air battery may be prevented. In addition, the anode may be compactly formed to make the constitution of the lithium air battery simple, and have improved electrochemical properties of the anode to improve the performance of the lithium air battery.

The followings are Examples 1 and 2 relating to the manufacturing method of the anode for a secondary battery according to the present invention.

[Example 1] Manufacture of LiSICON Protected Li Anode Using Adhesive/Sealant

A current collector (Cu or Ni), lithium metal (Li foil), separator and LiSICON (OHARA, AG-1) were pressurized at 10 kg/cm² using a press, as shown in FIG. 1(b), so that each component of the anode may be compressed. Silicone adhesive (Loctite 5900, Silicone Flange Sealant or 3M Super Silicone) was evenly applied on the compressed anode using a spatula. After maintaining the pressure during the curing of the applied adhesive (24 hours in the atmosphere), the pressure was removed. In this case, in order to induce the final microstructure change in the silicone sealing part formed on the anode, pressure, temperature, and maintaining time may be changed.

[Example 2] Manufacture of LiSICON Protected Li Anode Using Laser Welding

Cu sheet which was used as a current collector was deep-drawn, and processed into a shape of can. Lithium metal (Li foil), Separator and LiSICON (OHARA, AG-1) were positioned as shown in FIG. 3B, and pressurized at 10 kg/cm$^2$ using a press, so that each component can be compressed. Using a laser welder composed of Laser (IR pulsed laser, 1062 nm, frequency 1 MHz), Scanner, and Optics (variable BET, FL 1000 mm object lens), the compressed anode was welded. In this case, considering that the melt point of Cu current collector is 1300° C., the moving speed of the laser was maintained to 1200 m/min. In the case of laser welding, solidification instantly occurs, and thus, the maintaining time after welding may be within 10 min. In order to induce the final microstructure change of the welding part, the pressure of the press, the output of the laser, the spot size of the laser beam, the moving speed of the laser beam, and the maintaining time after welding may be changed.

Here, the advantage of the method for applying adhesive or sealant and rubber is having no thermal damage, since the components are joined without any thermal effect on the other components forming anode, especially the method may be simply applied without any other mechanical equipment. Moreover, laser welding enables the rapid joining between different materials (for examples, ceramic and metal). In addition, the strength of the laser beam to be used may be controlled by varying the spot size of the laser beam in the range of 15 μm to 300 μm. That is, the welding process variables may be set considering the melting point of each component, the change in shape depending on the change in the temperature, and the like, and the welding time is within 10$^{-6}$ sec which may have minimal effect on other components. Also, the joining method such as soldering and brazing as mentioned above, may be used in the joining between the different materials, especially the joining at low temperature.

The anode for a lithium secondary battery of the present invention, the manufacturing method thereof, and the lithium air battery including the same may prevent the permeation of moisture and oxygen gas into the lithium metal forming the anode of the lithium air battery, and thus, the durability may be improved, and rapid degradation of performance of the lithium air battery may be prevented.

Further, the anode may be compactly formed to make the constitution of the lithium air battery simple, and have improved electrochemical properties of the anode to improve the performance of the lithium air battery.

The present invention shall not be limited to the above Examples, the coverage varies, of course, and various modification are carried out by any person skilled in the art without departing from the gist of the present invention to be claimed in the claims, as well.

What is claimed is:
1. An anode for a lithium secondary battery comprising:
a current collector;
a lithium metal laminated on the current collector;
a separator containing an electrolyte laminated on the lithium metal;
a solid electrolyte laminated on the separator; and
a sealing part sealing a circumferential side of a laminate in which the current collector, the lithium metal, the separator and the solid electrolyte are laminated,
wherein the sealing part is closely adhered to the circumferential side of the laminate in which the current collector, the lithium metal, the separator and the solid electrolyte are laminated.

2. An anode for a lithium secondary battery comprising:
a current collector;
a lithium metal laminated on the current collector;
a separator containing an electrolyte laminated on the lithium metal;
a solid electrolyte laminated on the separator; and
a sealing part sealing a circumferential side of a laminate in which the current collector, the lithium metal, the separator and the solid electrolyte are laminated,
wherein the current collector has an empty inside and open one side, and the lithium metal, the separator, and the solid electrolyte are accommodated and laminated in turn on the inside of the current collector, and the sealing part is formed on a contact surface between the current collector and the solid electrolyte.

3. The anode for a lithium secondary battery of claim 1, wherein the electrolyte contained in the separator is an electrolyte containing an organic-based electrolyte or an ionic liquid.

4. The anode for a lithium secondary battery of claim 1, wherein the current collector is made of a nickel (Ni) or copper (Cu) material.

5. A lithium air battery comprising:
the anode for a lithium secondary battery of claim 1,
a cathode having a gas diffusion layer one side of which is in contact with air, and a catalyst layer which is formed on the other side of the gas diffusion layer, and being spaced apart from the anode for a lithium secondary battery; and
a water-based electrolyte to be provided between the anode and the cathode for a lithium secondary battery.

6. A lithium air battery comprising:
a housing part having a first housing provided with a space part having open upper side, and a second housing arranged on an upper side of the first housing to seal the space part of the first housing, and having an air accommodating part having an open lower side, and a vent hole communicating with the air accommodating part formed therein;
the anode for a lithium secondary battery of claim 1 which is accommodated in the space part of the first housing;
a cathode combined with the lower side of the air accommodating part of the second housing, spaced apart with the anode for a lithium secondary battery, and having a gas diffusion layer arranged in an upper side, and a catalyst layer formed in a lower side of the gas diffusion layer; and
a water-based electrolyte provided on the space part of the first housing, and between the anode of the lithium secondary battery and the cathode.

7. The lithium air battery of claim 6, further comprising a receptor provided on an upper side of the anode for a lithium secondary battery, and having receiving holes penetrating through upper and lower portions thereof, the receptor closely adhering the anode for a lithium secondary battery to the bottom of the space part.

8. The lithium air battery of claim 6, wherein the housing part further includes a third housing interposed between the first housing and the second housing, and having a fixing hole penetrating through upper and lower portions thereof, so that the cathode is fixed to the fixing hole.

* * * * *